US008049668B1

(12) United States Patent  (10) Patent No.: US 8,049,668 B1
Gines  (45) Date of Patent: Nov. 1, 2011

(54) METHOD AND SYSTEM FOR LOCATING SIGNAL EMITTERS USING ITERATIVE RESIDUAL WEIGHTING

(75) Inventor: David L. Gines, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 12/407,535

(22) Filed: Mar. 19, 2009

Related U.S. Application Data

(63) Continuation of application No. 12/402,835, filed on Mar. 12, 2009, now abandoned.

(51) Int. Cl.
*G01S 3/02* (2006.01)
(52) U.S. Cl. ........................................................ 342/465
(58) Field of Classification Search .................. 342/387, 342/451, 463–465, 444
See application file for complete search history.

(56) References Cited

U.S. PATENT DOCUMENTS

| 3,659,085 | A | * | 4/1972 | Potter et al. .................. 342/451 |
| 4,806,936 | A | * | 2/1989 | Williams et al. ............. 342/463 |
| 2002/0080069 | A1 | * | 6/2002 | Stilp et al. .................... 342/465 |
| 2005/0114034 | A1 | * | 5/2005 | Bagaini ........................ 702/14 |
| 2006/0250264 | A1 | | 11/2006 | Cutler et al. |
| 2007/0111746 | A1 | * | 5/2007 | Anderson ..................... 455/522 |
| 2007/0139269 | A1 | * | 6/2007 | Chen et al. ................... 342/463 |

FOREIGN PATENT DOCUMENTS

WO   WO 2008/051204 A2 * 5/2008

OTHER PUBLICATIONS

Pi-Chun Chen; , "A non-line-of-sight error mitigation algorithm in location estimation," IEEE Wireless Communications and Networking Conference, vol. 1, p. 316-320, 1999.*
Djuknic, G.M; Richton, R.E. Geolocation and Assisted-GPS. White Paper, Mobility: 3G-CDMA2000 & UMTS, Lucent Technologies, Bell Labs, May 2002.*
Huerta, J.M.; Vidal, J.; Giremus, A.; Tourneret, J.-Y.; , "Joint Particle Filter and UKF Position Tracking in Severe Non-Line-of-Sight Situations," Selected Topics in Signal Processing, IEEE Journal of , vol. 3, No. 5, pp. 874-888, Oct. 2009.*
Mikhalev et al., "Comparison of Hough Transform and Particle Filter Methods of Emitter Geolocation using Fusion of TDOA Data", 4th Workshop on Positioning, Navigation and Communication, 2007. WPNC '07. Mar. 22-22, 2007 pp. 121-127.
http://en.wikipedia.org/wiki/Multilateration.
http://en.wikipedia.org/wiki/Trilateration.
http://en.wikipedia.org/wiki/Angle_of_Arrival.
http://en.wikipedia.org/wiki/Received_Signal_Strength_Indication.

* cited by examiner

*Primary Examiner* — Thomas H Tarcza
*Assistant Examiner* — Fred H Mull (57) ABSTRACT

A method and system for determining a location of a first device that emits a signal: provide at least three sensors separated and spaced apart from each other; determine estimated location data for the first device for each sensor or unique sensor pair; determine an estimated location of the first device using the estimated location data for each sensor or unique sensor pair; determine residual values for the estimated location data for each sensor or sensor pair; convert the residual values into corresponding weights for the estimated location data for each sensor or sensor pair; weight the estimated location data for each sensor or sensor pair by its corresponding weight; and update the estimated location of the first device using the weighted estimated location data for each sensor or sensor pair.

20 Claims, 10 Drawing Sheets
(1 of 10 Drawing Sheet(s) Filed in Color)

METHOD AND SYSTEM FOR LOCATING SIGNAL EMITTERS USING ITERATIVE RESIDUAL WEIGHTING

CROSS-REFERENCE TO RELATED APPLICATIONS

This application is a continuation application of application Ser. No. 12/402,835 filed on 12 Mar. 2009, which is hereby incorporated for all purposes.

BACKGROUND

There are a number of applications where it is desirable to be able to identify an unknown location of an object which emits a signal. One example occurs when planning an indoor wireless local area network (LAN) having one or more RF or microwave emitters.

Of course precisely defining an object's location requires specifying coordinates in three dimensions (e.g., longitude, latitude, and altitude). In the discussion to follow, for simplicity of explanation it is assumed that the third coordinate (i.e., altitude) is either known or is otherwise easily determined once the other two coordinates (e.g., latitude and longitude) are identified. Those skilled in the art will be able to extrapolate the discussion to follow to the case where all three coordinates are to be determined.

There are a few known methods to locate signal emitters using a plurality of distributed sensors, or receivers, which are spaced apart from each other. Among these methods are: Angle of Arrival (AOA), Time of Arrival (TOA), Time Difference of Arrival (TDOA), and Received Signal Strength (RSS).

In the AOA method, the angle of arrival of the signal is measured with special directional antennas at each receiver. This information is combined to help locate the signal emitter using lines of bearing.

In the TOA method, a signal emitter transmits a signal at a predetermined or known time. Three or more sensors each measure the arrival time of the signal at that sensor. The absolute propagation time between emitter and sensor defines a distance or range. The range is computed using the well-known relation, r=vt, where r is the range, v is the propagation velocity, and t is the time of propagation between emitter and sensor. The known time of arrival at each sensor leads to circles of constant received time, centered at that sensor.

Figure 1:
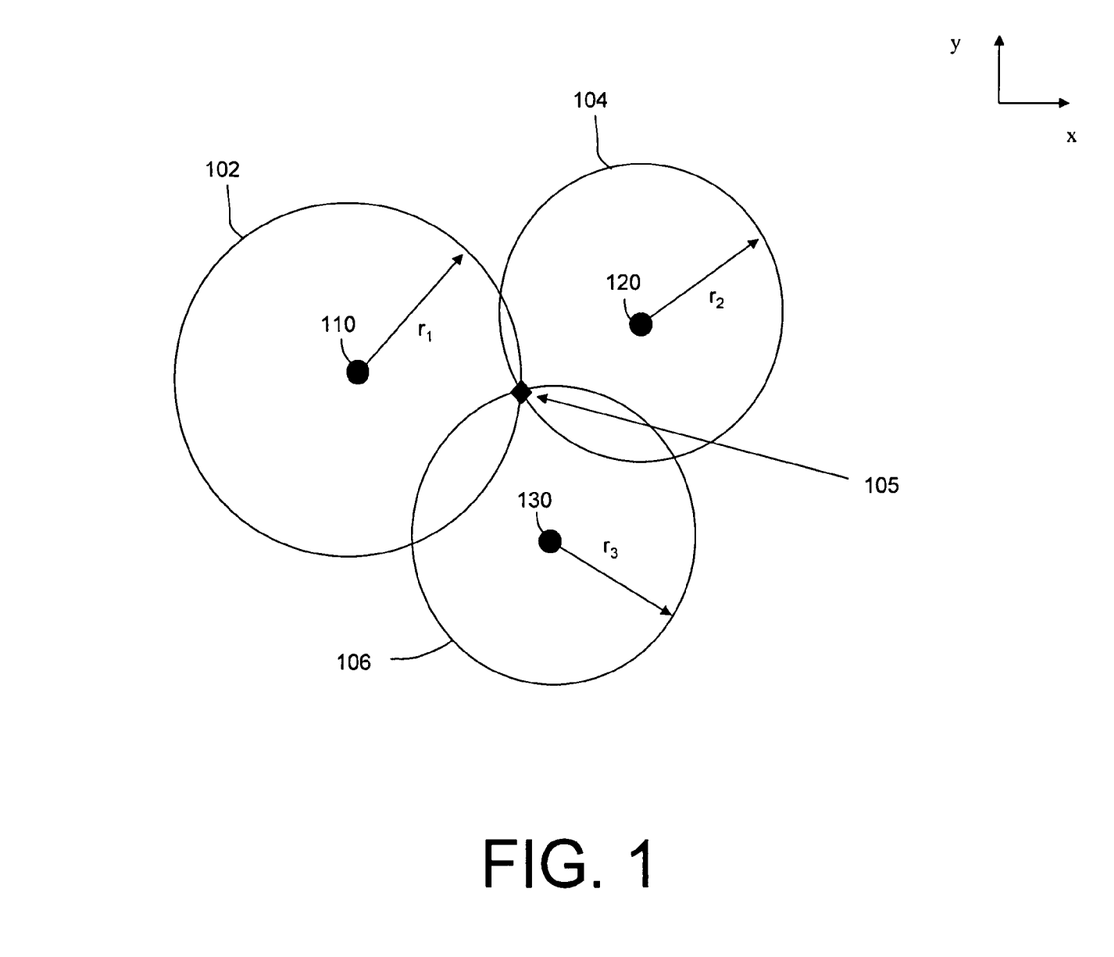
FIG. 1 illustrates a time of arrival (TOA) algorithm for determining the location of a signal emitter.

FIG. 1 illustrates some principles of a TOA method of locating an emitter 105 using three sensors 110, 120 and 130. Shown in FIG. 1 are three range-defined circles 102, 104 and 106 for the three sensors 110, 120 and 130, having respective radii r1, r2 and r3. The location where the circles 102, 104 and 106 from the three sensors 110, 120 and 130 intersect as shown in FIG. 1 is the most likely location of the signal emitter 105. In general, at least three sensors are required for the TOA method, but more than three sensors can be employed.

A chief limitation of the TOA method is that the emitter(s) to be located and the sensors must be synchronized.

Figure 2A:
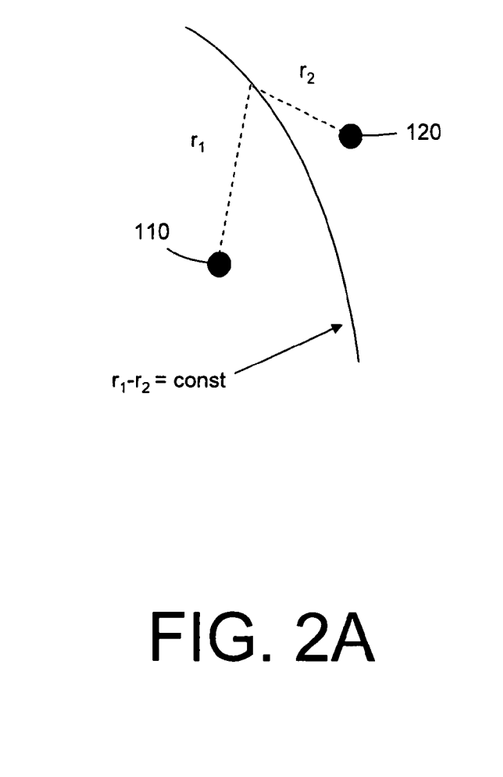
FIGS. 2A-B illustrate a time difference of arrival (TDOA) algorithm for determining the location of a signal emitter.

The TDOA method, also known sometimes as multilateration or hyperbolic positioning, is a process of locating an emitter by accurately computing the time difference of arrival at three or more sensors of a signal emitted from an emitter to be located. In particular, if a signal is emitted from a signal emitter, it will arrive at slightly different times at two spatially separated sensor sites, the TDOA being due to the different distances to each sensor from the emitter. For given locations of the two sensors, there is a set of emitter locations that would give the same measurement of TDOA. Given two known sensor locations and a known TDOA between them, the locus of possible locations of the signal emitter lies on a hyperbola. As shown in FIG. 2A, the hyperbola is defined as the locations where the difference between distances to the two sensors is a constant, or, in this case:

$$r_1 - r_2 = v(t_1 - t_2).$$

With three or more sensors, multiple hyperbolas can be constructed from the TDOAs of different pairs of sensors. The location where the hyperbolas generated from the different sensor pairs intersect is the most likely location of the signal emitter. In practice, the sensors are time synchronized and the difference in the time of arrival of a signal from a signal emitter at a pair of sensors is measured.

Figure 2B:
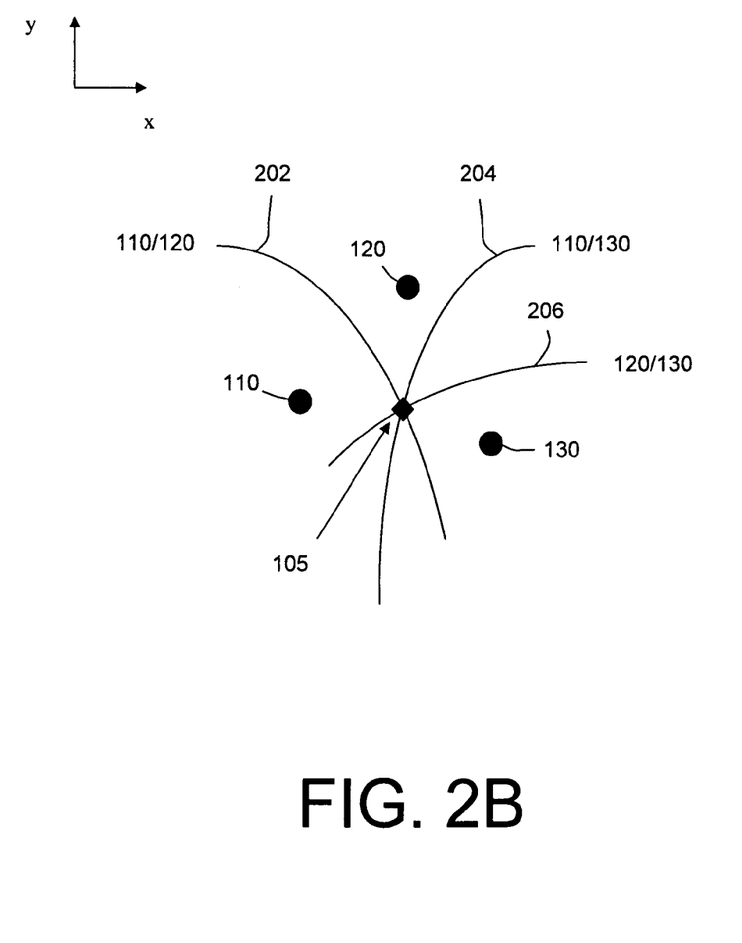

FIG. 2B illustrates some principles of a TDOA method of locating an emitter 105 using three sensors 110, 120 and 130. Shown in FIG. 2 are three range-defined hyperbolas 202, 204 and 206 for the three sensor pairs 110/120, 110/130 and 120/130. The location where the hyperbolas 202, 204 and 206 from the three sensor pairs intersect, as shown in FIG. 2B, is the most likely location of the signal emitter 105. In general, at least three sensors are required for the TDOA method, but more than three sensors can be employed.

Figure 3:
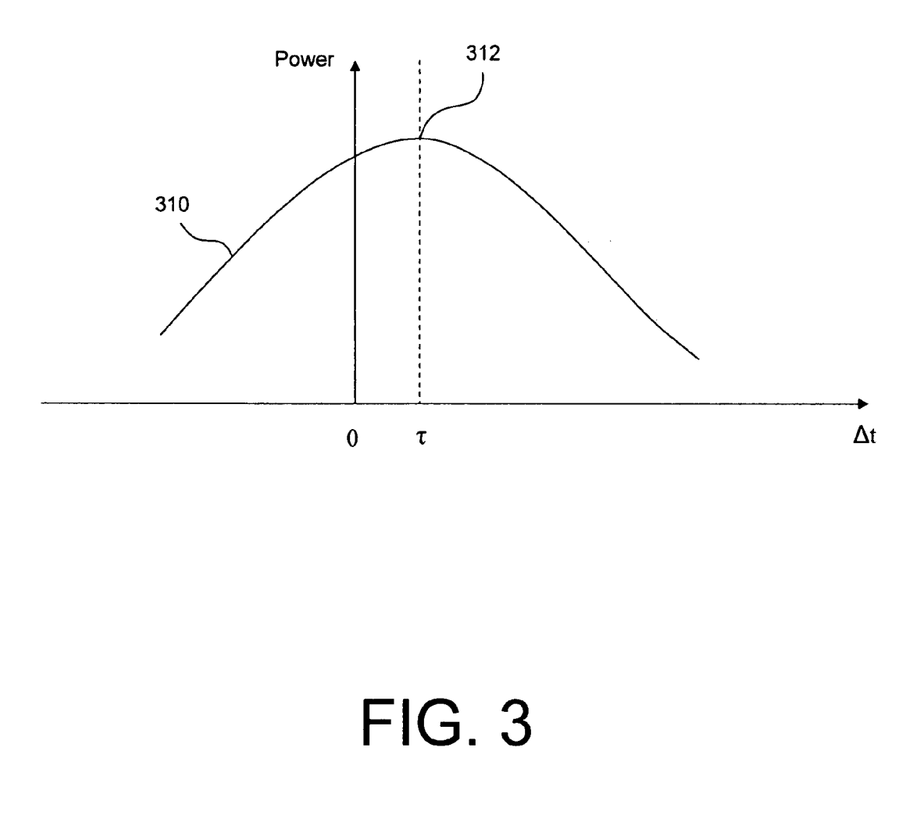
FIG. 3 shows an example of a cross-correlation curve.

In many cases, the time-difference of arrival of a signal at two sensors is difficult to measure since the timing and signal characteristics of the emitter are unknown. In those cases, cross-correlation is a common method for determining the delay τ. FIG. 3 shows an example cross-correlation curve 310. The time-difference of arrival between the two sensors is defined as the location 312 where the curve 310 has its maximum.

In the RSS method, the power of the received signal at each sensor is measured, and the signal strength information is processed to help locate the signal emitter. There are a few different emitter location procedures that employ RSS.

In a basic RSS procedure, the power of the signal received at each sensor is measured. By knowing the broadcast power of the emitter, $P_0$, one can convert the received power level, $P_1$, to a range using the idealized expression: $P_1 = P_0 * r_1^{-2}$. Other variants of this equation use statistical approaches to account for varieties in terrain. The range from each sensor defines a circle of probable locations for the emitter, centered at that receiver, similar to what is shown in FIG. 1.

Another form of RSS is a relative power measurement, used when the power level of the signal transmitted at the emitter is not known. In this approach the relative signal power is measured at a pair of two sensors, and the received power levels at the sensors are processed to determine a circle of probable locations for the emitter.

Figure 4:
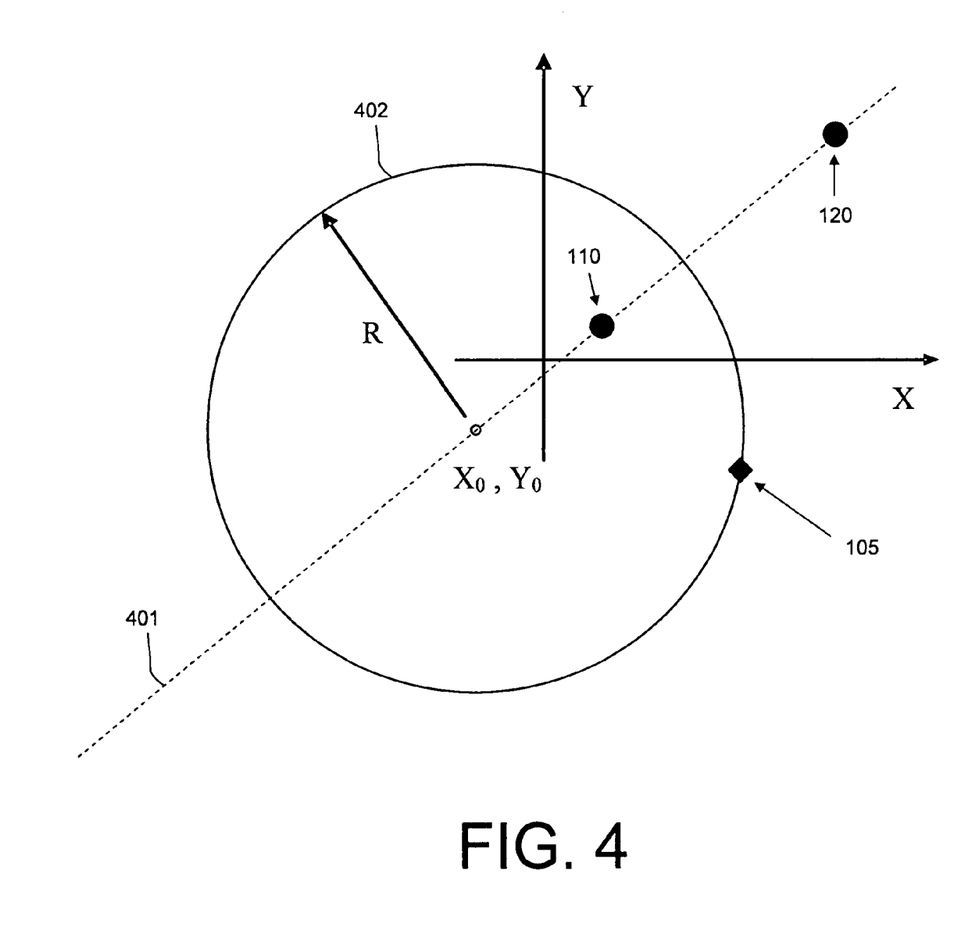
FIG. 4 illustrates a received signal strength (RSS) algorithm for determining the location of a signal emitter.

A more detailed explanation of principles employed in such an RSS method of locating a signal emitter will now be provided with respect to FIG. 4.

FIG. 4 illustrates a general case of an emitter 105 and two sensors 110 and 120 which each receives a signal from emitter 105 wherein a circle 402 of probable locations for emitter 105 is determined from a ratio the received signal powers at sensors 110 and 120.

In free space, the received power of a signal transmitted by emitter 105 decreases with the square of the distance from emitter 105.

$$P_1 = P_0 \left(\frac{r_0}{r_1}\right)^2, \quad (1)$$

where $r_1$ is the distance between emitter 105 and first sensor 110, and 2 is the exponential rate at which the power decreases with distance.

Likewise the received power $P_2$ at second sensor 120 is:

$$P_2 = P_0 \left(\frac{r_0}{r_2}\right)^2, \quad (2)$$

where $r_2$ is the distance between emitter 105 and second sensor 120.

This leads to:

$$\frac{P_1}{P_2} = \left(\frac{r_2}{r_1}\right)^2 \quad (3)$$

With a bit of manipulation this yields:

$$\frac{\log(P_1) - \log(P_2)}{2} = \frac{r_2}{r_1} = \text{const} = \alpha \quad (4)$$

This method is sometimes referred to as Signal Attenuation Difference of Arrival (SADOA). It can be shown that this leads to the circle 402 (the so-called circle of Apollonius) of a given radius R and centered on a point $X_0, Y_0$ located on the line 401 defined by the two sensors 110 and 120. This relationship is illustrated in FIG. 4.

With at least three sensors (e.g., A, B & C), three such circles are generated from the corresponding three unique pairs of sensors (e.g., A/B, A/C & B/C), and the location of emitter 100 can be found where the three circles intercept.

However, the addition of measurement uncertainty and noise makes it difficult to locate a sensor analytically with a high degree of accuracy using the AOA, TOA, TDOA, and RSS techniques as described above. Several error factors affect the accuracy of measurements made by the sensors. These error factors may include:

Noise. In low Signal-to-noise ratio (SNR) situations, emitter location is more difficult to determine with a high degree of accuracy because measurements of signal power, time-of-arrival, etc. are affected.

Timing and calibration errors. Although these errors are typically small compared to other errors described here, there is nevertheless a need for algorithms that are robust in instances where these errors are significant.

Competing emitters. Signals from multiple emitters can lead to ambiguous results.

Multipath propagation. Reflections from multipath propagation can distort or obscure the true time of arrival, angle of arrival, or strength of a signal received at a sensor.

Blocked line-of-sight, or un-detected direct path (UDP), is a condition in which the main propagation path between the emitter and receiver is blocked.

Some or all of these errors can affect the graphical depictions in FIGS. 1 & 2, causing the circles or hyperbolas to move so that they do not all intersect at a single point.

Figure 5:
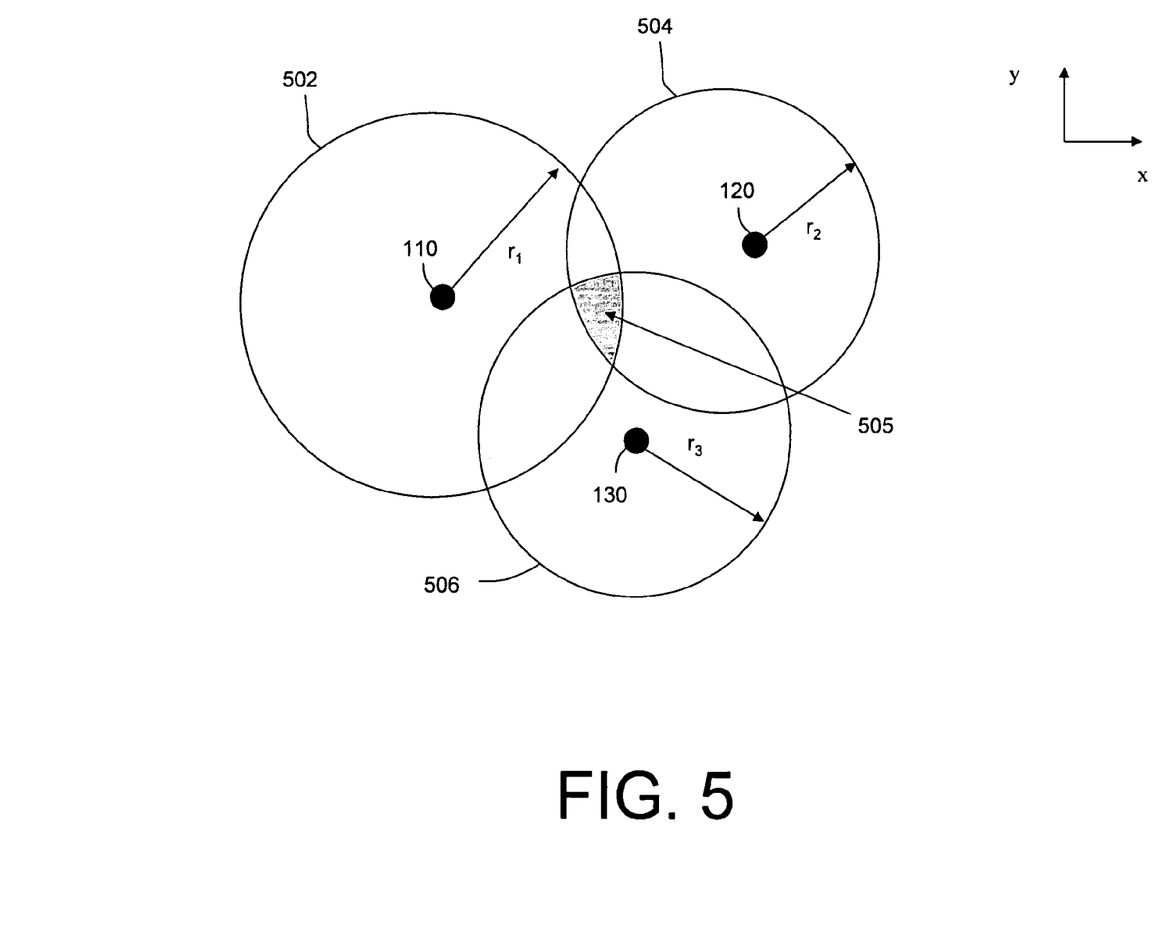
FIG. 5 illustrates a time of arrival (TOA) algorithm for determining the location of a signal emitter in an environment where one or more error-generating factors are present.

The effect of all of these errors is illustrated in the example shown in FIG. 5.

FIG. 5 illustrates a TOA method of locating an emitter 105 using three sensors 110, 120 and 130 in the presence of one or more of the factors listed above. Shown in FIG. 5 are three range-defined circles 502, 504 and 506 for the three sensors 110, 120 and 130, having respective radii r1, r2 and r3. Because of measurement uncertainty due to one or more of the error-generating factors described above, the three circles 502, 504 and 506 do not intersect at one point. Instead, the three circles define an overlap region 505 which may be considered a most likely region for the location of emitter 105. It can be understood that as the measurement uncertainty increases due to various factors described above, the size of the overlap region 505 may increase to such a degree that the emitter's location cannot be determined to a desired level of accuracy.

Thus, more robust methods of locating an emitter are required to obtain a more accurate solution.

What is needed, therefore, is a method and system for locating signal emitters that addresses one or more of these shortcomings.

SUMMARY

In an example embodiment, a method is provided for determining the location of a first device that emits a signal. The method includes: (a) providing at least three sensors separated and spaced apart from each other; (b) determining estimated location data for the first device for each sensor or unique sensor pair; (c) determining an estimated location of the first device using the estimated location data for each sensor or unique sensor pair; (d) determining residual values for the estimated location data for each sensor or sensor pair; (e) converting the residual values into corresponding weights for the estimated location data for each sensor or sensor pair; (f) weighting the estimated location data for each sensor or sensor pair by its corresponding weight; and (g) updating the estimated location of the first device using the weighted estimated location data for each sensor or sensor pair.

In another example embodiment, a system determines a location of a first device that emits a signal. The system comprises: at least three sensors separated and spaced apart from each other, each of the sensors including a receiver adapted to receive the signal emitted by the first device and to acquire the received signals for each of the sensors; a network connecting the sensors and adapted to communicate data from the sensors; and a processor programmed to execute an algorithm comprising: (a) determining estimated location data for the first device for each sensor or unique sensor pair; (b) determining an estimated location of the first device using the estimated location data for each sensor or unique sensor pair; (c) determining residual values for the estimated location data for each sensor or sensor pair; (d) converting the residual values into corresponding weights for the estimated location data for each sensor or sensor pair; (e) weighting the estimated location data for each sensor or sensor pair by its corresponding weight; and (f) updating the estimated location of the first device using the weighted estimated location data for each sensor or sensor pair.

BRIEF DESCRIPTION OF THE DRAWINGS

The patent or application file contains at least one drawing executed in color. Copies of this patent or patent application publication with color drawings will be provided by the Office upon request and payment of the necessary fee.

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Figure 6:
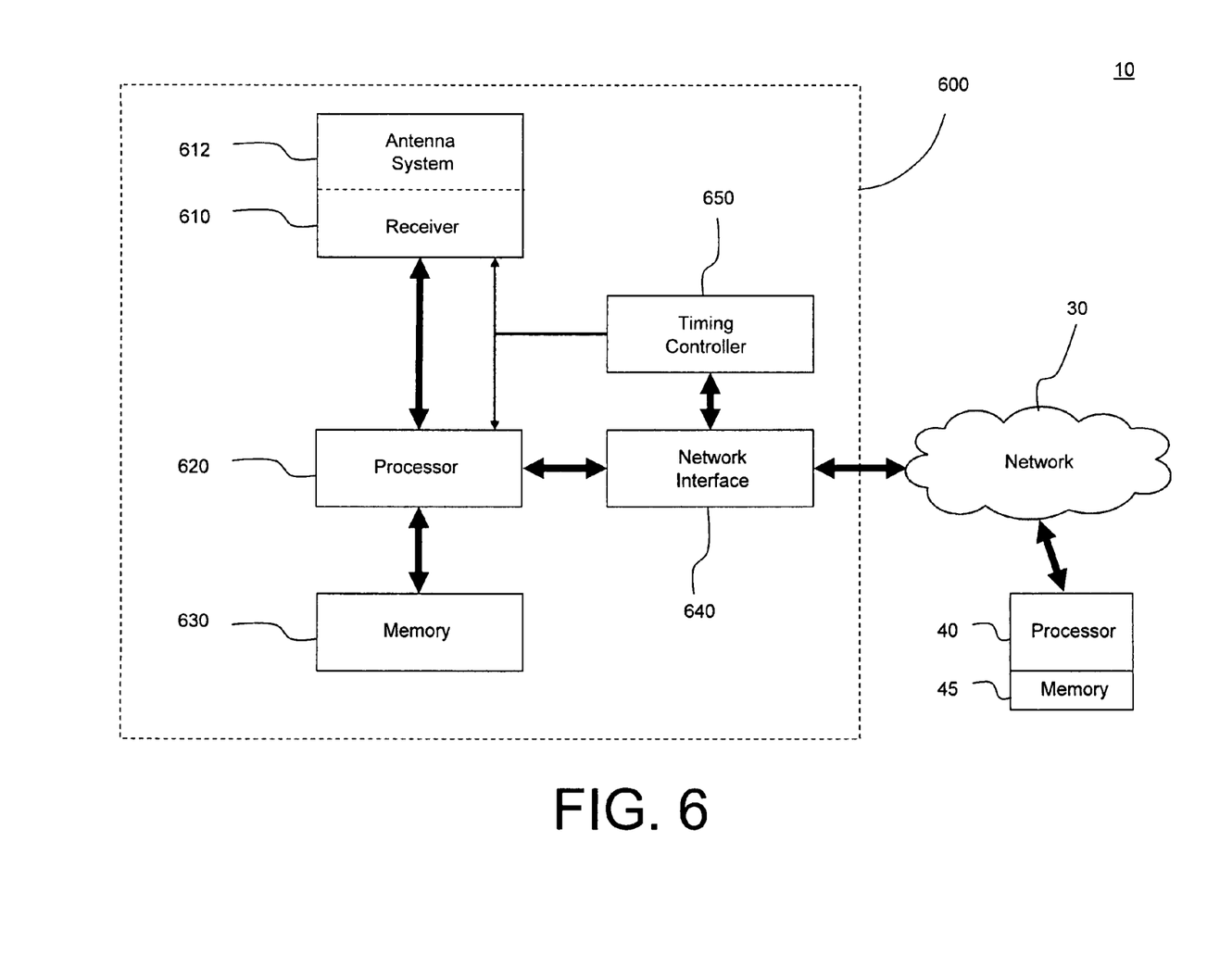
FIG. 6 illustrates shows a functional block diagram of one embodiment of a sensor that may be employed in a system for locating a signal emitter.

FIG. 6 shows a functional block diagram of one embodiment of a sensor 600 that may be employed in a system 10 for locating signal emitters. As will be appreciated by those skilled in the art, one or more of the various "parts" shown in FIG. 6 may be physically implemented using a software-controlled microprocessor, hard-wired logic circuits, or a combination thereof. Also, while the parts are functionally segregated in FIG. 6 for explanation purposes, they may be combined variously in any physical implementation.

Sensor 600 includes a receiver 610, a processor 620, a memory 630, a network interface 640, and a timing controller 650. In some embodiments, receiver 610 includes, or is connected to, an antenna system 612. In some embodiments, antenna system 612 may comprise a directional antenna system.

Receiver 610 provides functionality for sensor 600 to receive and process a signal (e.g., an RF signal, a microwave signal, an acoustic signal, etc.) received from a signal emitter. In some embodiments, receiver 610 is able to simultaneously receive signals from a plurality of different signal emitters.

Processor 620 is configured to execute one or more software algorithms in conjunction with memory 630 to provide functionality for sensor 600. Beneficially, processor 620 includes its own memory (e.g., nonvolatile memory) for storing executable software programming code that allows it to perform the various functions of sensor 300. Alternatively, or additionally, executable code may be stored in designated memory locations within memory 630.

Memory 630 stores data and/or software programming code used in operations of sensor 600.

Network interface 640 interfaces sensor 600 to a network 30 that includes a plurality of other sensors 600. By means of network 30, sensors 600 may share or communicate information with each other, and/or to a central controller or processor 40 and/or associated memory 45 that may be connected via network 30.

Timing controller 650 controls the timing of signal processing operations in sensor 600. In a beneficial arrangement, sensor 600 shares timing information with other sensors (not shown in FIG. 6) in network 30 via network interface 640. In one embodiment, timing controllers 650 of sensors 600 in network 30 are synchronized with each other to have a common sense of time. In one embodiment, timing controllers 650 in sensors 600 may obtain a common sense of time via a precision timing protocol (PTP) of IEEE-1588. In such a case, central controller or processor 40 may include a master clock for sensors 600 in network 30, or a separate dedicated master clock may be provided in network 30. In another embodiment, one of the timing controllers 650 in one of the sensors 600 may operate as a master clock for sensors 600 in network 30.

In an alternative embodiment, a sensor that may be employed in a system for locating signal emitters could be a simple probe at the end of a wire or fiber that remotely connects to a central receiver and/or processor.

Now a method and system of locating signal emitters using received signals at three or more sensors such as sensor 600 of FIG. 6 will be explained. In various embodiments, the calculations and other steps described below may be performed by processor 40, by one or more of the processors 620 of sensors 600, or by a combination of processor 40 and processors 620 programmed to execute predetermined instructions which may be, for example, stored in a corresponding memory or memories 45 and/or 630.

Referring back to FIG. 5, statistical methods such as least-squares fitting and maximum likelihood estimates, or more robust graphical methods may be employed to obtain a unique solution for the location of emitter 105.

Robust graphical methods have the advantage of being easy to compute, and easy to interpret. They are performed by converting the hyperbolas to likelihood functions. These functions have maximum likelihood along the defined circle or hyperbola curve (depending on the location method being employed), and gradually declining likelihood away from the curve.

An exemplary embodiment of a robust graphical emitter location method employing likelihood functions will now be explained.

A first step is to define a grid of points (xi, yj) i=1 ... N, j=1 ... M, at which estimated location data in the form of a likelihood function will be computed. The next step is to generate a likelihood function representing the likelihood of the signal emitter being located at a particular location.

Figure 7A:
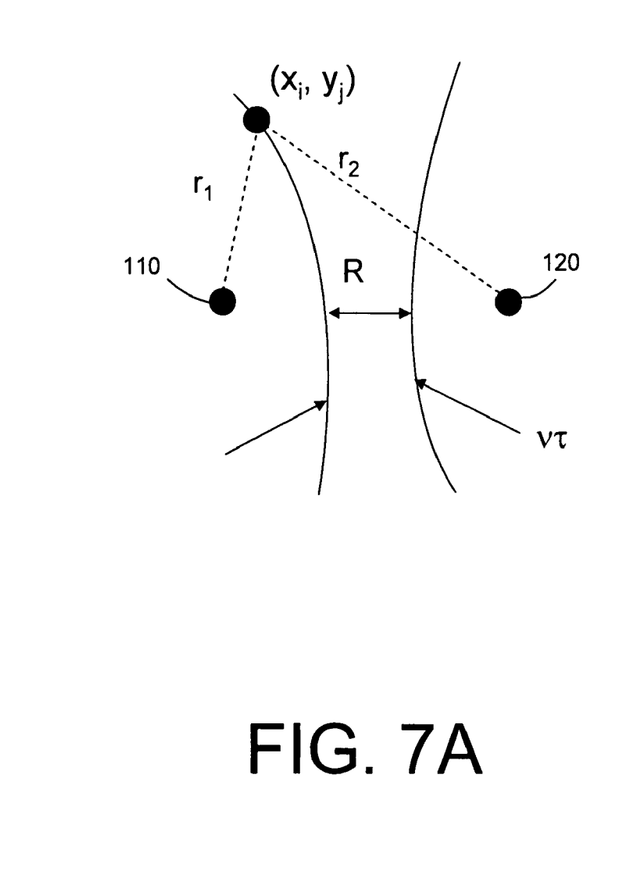
FIG. 7A illustrates a residual value for estimated location data in the case of a system that generates hyperbolic likelihood curves.

In one embodiment, the approach is based on computing a residual. In location systems which generate hyperbolas of probable locations for the emitter (e.g., in TDOA systems), a metric is computed which converts the cross-correlation data into a likelihood function. In that case, the residual with respect to first and second sensors 110 and 120 at a point (xi, yj) is defined as:

$$R_{1,2} = |(r_1 - r_2) - v\tau_{1,2}|, \quad (5)$$

where v represents the speed of propagation of the signal from the emitter (e.g., the speed of light), where r1 and r2 are the distances between the point (xi, yj) and the first and second sensors 110 and 120 respectively, of the sensor pair, and where $\tau_{1,2}$ is the time-difference of arrival for the two sensors as determined by the location of the peak in the cross-correlation data (see FIG. 3). Graphically, the TDOA residual value for a sensor pair at point (xi, yj) may be seen as the shortest distance between the hyperbola generated by the sensor pairs' measurements (as in FIG. 2) and the hyperbola that goes through (xi, yj), as illustrated in FIG. 7A.

Figure 7B:
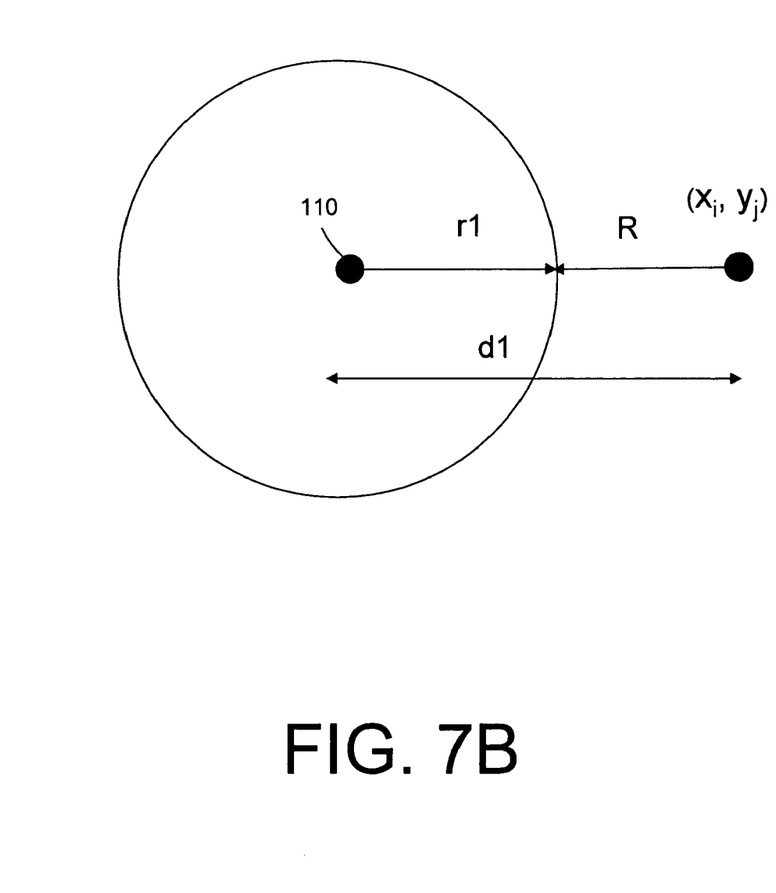
FIG. 7B illustrates a residual value for estimated location data in the case of a system that generates circular likelihood curves.

In location systems which generate circles of probable locations for the emitter (e.g., in TOA systems and RSS systems employing power ratios), the residual at location (xi, yj) is defined as:

$$R_1 = |d_1 - r_1| \quad (6)$$

where d1 is the distance between the circle center and the point (xi, yj), and r1 is the radius of the circle, as illustrated in FIG. 7B.

Formally, in the case of hyperbola systems (e.g., TDOA systems) the likelihood function for any sensor pair may be computed as:

$$l_{p,q}(x, y) = e^{-sR_{p,q}(x,y)} \quad (7)$$

where s is a constant. Note that there are other possible likelihood functions. Another exemplary likelihood function is:

$$l_{p,q}(x, y) = \frac{1}{sR_{p,q}(x, y)} \quad (8)$$

The total likelihood function is the sum over all unique sensor pairs:

$$L(x, y) = \sum_{p,q} l_{p,q}(x, y) \quad (9)$$

An estimated location of the emitter may be determined as the location where the peak or maximum value of equation (9) is found.

Figures 8A, 8B:
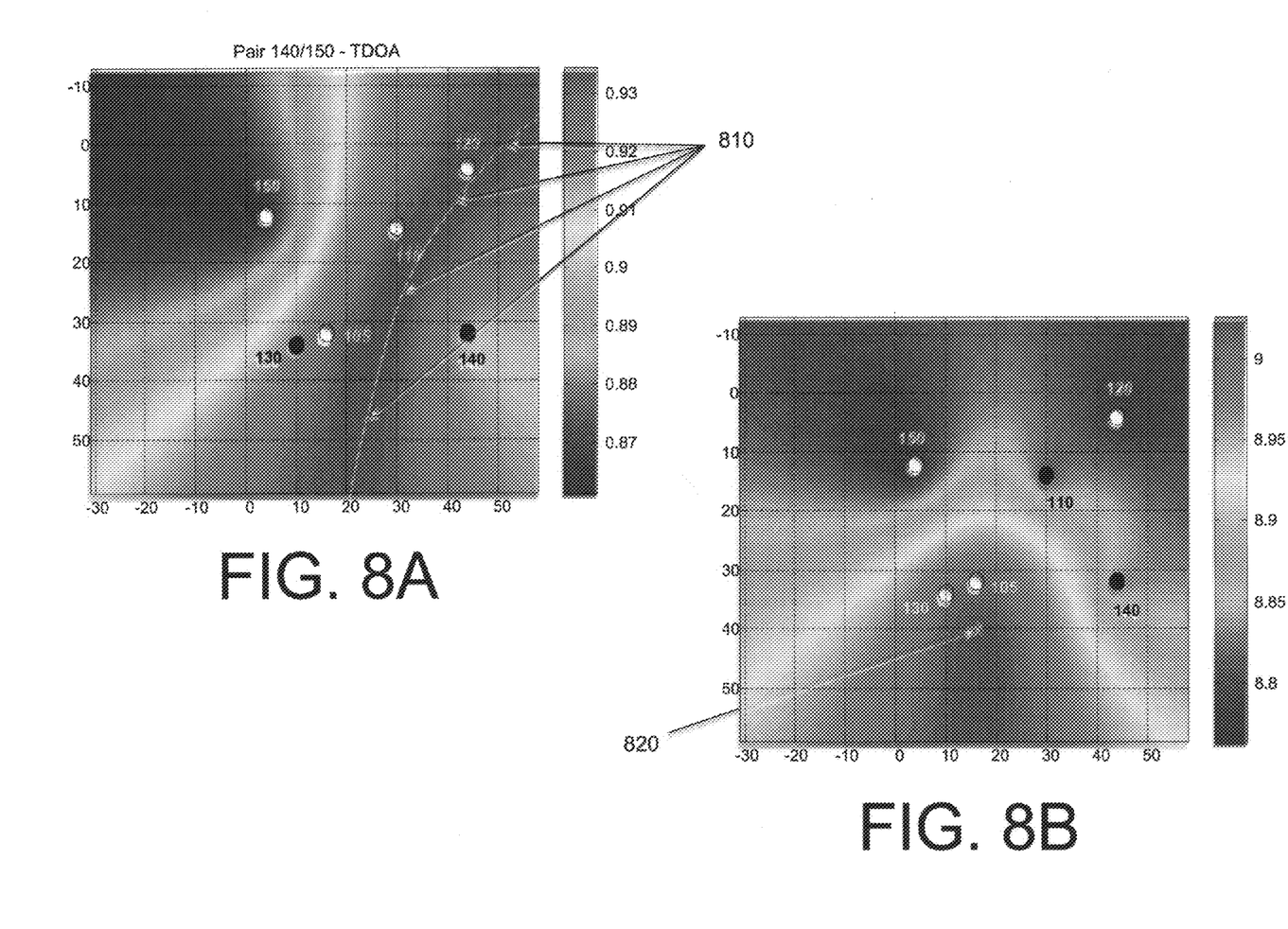
FIG. 8A illustrates a graphical plot of estimated location data (a likelihood plot) for an emitter calculated for one sensor pair.
FIG. 8B illustrates a graphical plot of combined estimated location data (a likelihood plot) for an emitter calculated for ten sensor pairs.

FIG. 8A illustrates an example of a graphical plot of a likelihood function for one pair of sensors 140 and 150 among a plurality of sensors 110, 120, 130, 140 and 150 employing a TDOA location algorithm. The original hyperbola 810 lies along the peak of a surface defined by the likelihood function, and denotes the locations having the maximum likelihood of being the actual location for emitter 105. In FIG. 8A, the hyperbola is "spread out" to denote non-zero probability away from the original hyperbola 810. In the example illustrated in FIG. 8A, the hyperbola 810 from the sensor pair 140 & 150 has a significant error with respect to the actual location of emitter 105. In general, this error may be reduced by generating likelihood functions for a large number of unique sensor pairs, and then determining a total likelihood function based on all of the likelihood functions, for example using equation (9) above.

FIG. 8B illustrates a graphical plot of a total likelihood function generated from combining likelihood functions from ten (10) sensor pairs: 110/120, 110/130, 110/140, 110/150, 120/130, 120/140, 120/150, 130/140, 130/150 and 140/150. The estimated location of emitter 105 (e.g., the location where the peak or maximum value of equation (9) is found) is illustrated in FIG. 8B as 820. As can be seen in FIG. 8B, the location 820 has a significant error with respect to the actual location of emitter 105, which may be a result of one or more of the various error factors described above (noise, multipath, blocked signals, timing errors, etc.).

As described above, a function (e.g., equation (7)) based on residual values (e.g., equations (5) and (6)) is employed to construct and graph likelihood functions for the location of the emitter over a set of grid points, and the likelihood functions from a plurality of sensors or sensor pairs may then be combined to determine an estimated location of the emitter.

Beneficially, residual values may also be employed to improve the accuracy of algorithms for determining the location of a signal emitter, as described below.

Given an estimate of the emitter location (xi, yj), the residual describes the difference between that estimate, and the estimated location data from a single sensor or sensor pair. In this context, the residual provides a backward looking metric which illustrates how well each of the individual sets of estimated likelihood data (e.g., equation (7)) match the overall likelihood data (e.g., equation (9)).

This information is useful in helping to identify which sensor(s) or sensor pair(s) may be corrupted by bad data. If a particular sensor has a blocked direct path to the emitter, for example, it may be expected that the timing and/or power information from that sensor is compromised. In such cases, the data from that sensor may exhibit large residual values, and thus be identified as inconsistent with the estimated location data from other sensors or sensor pairs.

Once an estimate is made of the consistency among the different sensors or sensor pairs, a next step is to recalculate the combined likelihood function (e.g., in equation (9)) by first weighting the estimated location data set from each sensor or sensor pair according to its consistency as measured by the residual values for the sensor or sensor pair. In the above example, the data from a sensor with a blocked direct path would be only lightly weighted, thus minimizing its contribution. In one embodiment, a weighted version of equation (9) is calculated as:

$$L(x, y) = \sum_{p,q} w_{p,q} l_{p,q}(x, y) \quad (10)$$

where w is a weighting function related to the residual, and the individual likelihood functions are as they were calculated before.

In one embodiment, the weighting function may be chosen as:

$$w = e^{-kR} \quad (11)$$

where k is a constant. In another embodiment, the weighting function may be:

$$w = \frac{1}{kR} \quad (12)$$

Other weighting functions may be employed but, beneficially, the weighting function is inversely proportional to residual value. In another embodiment, the weighting function may include the geometric dilution of precision (GDOP).

Once a new estimated location is determined with respect to equation (10), beneficially the process may be iterated by: (1) recalculating the residual values for all sensors or sensor pairs with respect to new estimated location; (2) calculating new weighting function based on the residuals; and (3) recalculating a new estimated location using equation (10).

Figure 9:
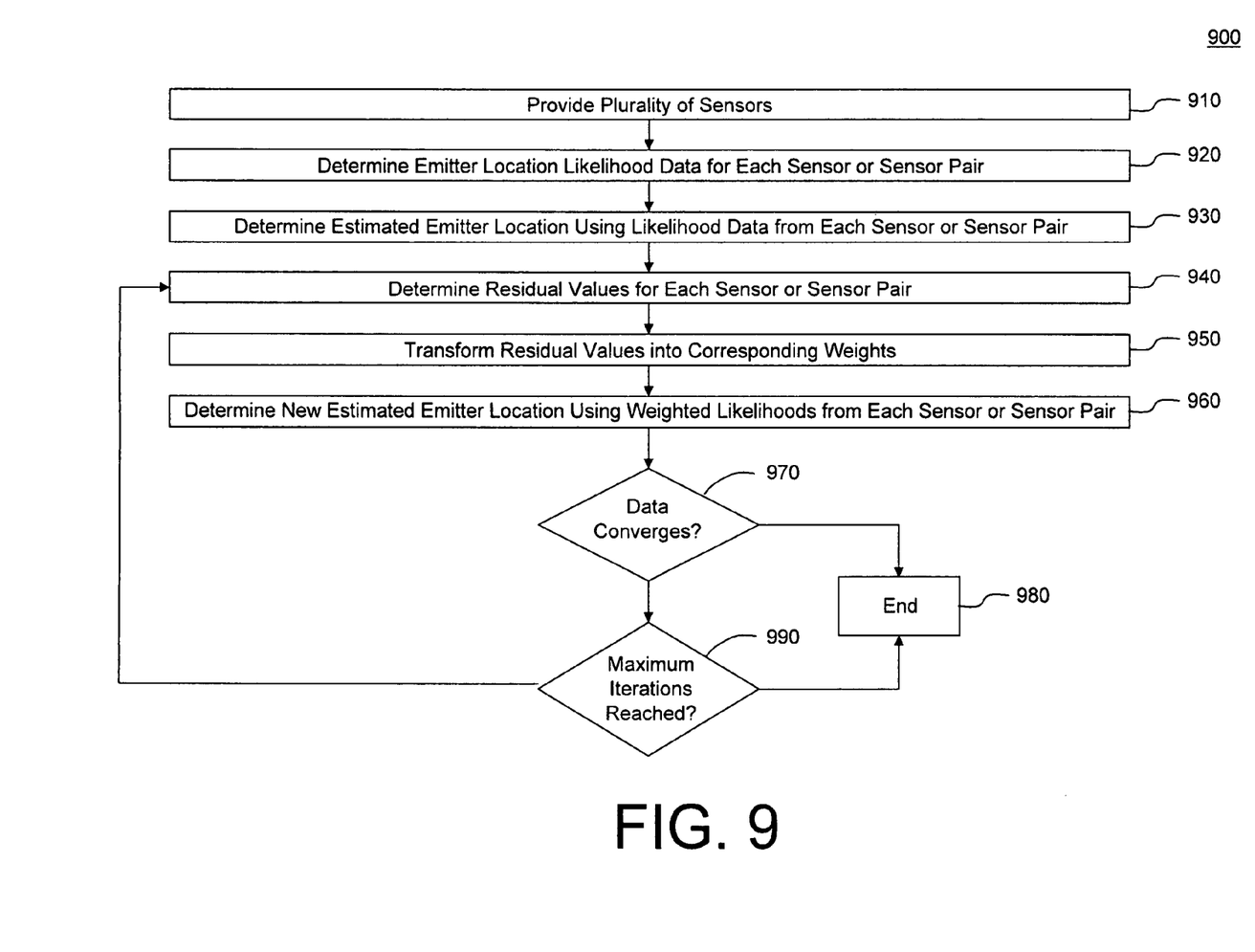
FIG. 9 is a flowchart illustrating one embodiment of a method of locating an emitter using signals received at multiple sensors.

FIG. 9 shows a flowchart of one embodiment of a method 900 of locating a signal emitter.

In a step 910 a system provides a plurality of sensors (e.g., sensor 600).

In a step 920 a processor (e.g., processor 40 and/or processor(s) 620) determines emitter location likelihood data for each sensor or sensor pair.

In a step 930 a processor (e.g., processor 40 and/or processor(s) 620) determines an estimated emitter location using the likelihood data from each sensor or sensor pair.

In a step 940 a processor (e.g., processor 40 and/or processor(s) 620) determines residual values for each sensor or sensor pair.

In a step 950 a processor (e.g., processor 40 and/or processor(s) 620) transforms the residual values into corresponding weights.

In a step 960 a processor (e.g., processor 40 and/or processor(s) 620) determines a new estimated emitter location using the weighted likelihood data from each sensor or sensor pair.

In a step 970 a processor (e.g., processor 40 and/or processor(s) 620) determines whether or not the weighted likelihood data has converged. Beneficially, convergence may be determined to have occurred when the difference between a previous estimated location of the emitter and an updated estimated location of the emitter is less than a predetermined convergence threshold value. If the data is determined to have converged, then the process 900 ends at step 980.

Otherwise, if the data has not converged, then in a step 990 a processor (e.g., processor 40 and/or processor(s) 620) determines whether a maximum number of iterations have been performed. Beneficially, when the number of iterations equals a predetermined maximum permitted number of iterations, then the process 900 ends at step 980.

Otherwise, the process returns to step 940 and another iteration is performed.

Figure 10:
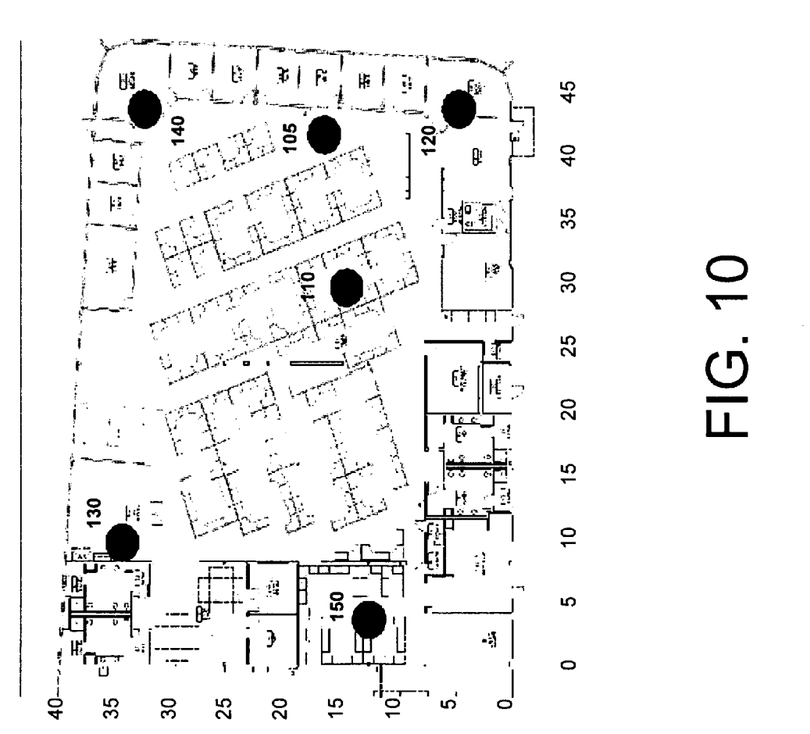
FIG. 10 illustrates an exemplary building floor-plan and sensor layout.

FIG. 10 illustrates an exemplary building floor-plan and sensor layout that was employed to test the effectiveness of an exemplary embodiment of an iterative emitter location algorithm that employs weighting based on residual values. Approximately 300 measurements were made while varying the following parameters: emitter location, transmitted power, and transmitted signal bandwidth. For the measurements, the weighting function of equation 11 were employed, with k=5. Both RSS and time-based algorithms were employed. Table 1 show that, in this particular example, the disclosed algorithm performed better than either the power or time-based measurements alone.

TABLE 1

| Measurement Algorithm | Mean Error |
|---|---|
| Iterative Residual Weighting | 10.5 m |
| RSS | 12.2 m |
| TDOA | 20.0 m |

While example embodiments are disclosed herein, one of ordinary skill in the art appreciates that many variations that are in accordance with the present teachings are possible and remain within the scope of the appended claims. In particular, some exemplary embodiments were described above with respect to RF or microwave emitters and sensors. However, the principles set forth above can be applied to a variety of different signals other than RF or microwave signals, including other electromagnetic signals, and acoustic signals. Also, the propagation models used need not be free-space. Ideally path loss models that are employed match the environment in which the sensor system is deployed. In addition, the description above describes things in two dimensions, but the principles could be generalized to three dimensions. For example, in a case employing TOA, a solution in three dimensions is the volume of intersection of several spherical surfaces. The invention therefore is not to be restricted except within the scope of the appended claims.

The invention claimed is:

1. A method of determining a location of a first device, comprising:
   (a) providing at least three sensors separated and spaced apart from each other;
   (b) determining estimated location data for the first device for each sensor or unique sensor pair;
   (c) determining an estimated location of the first device using the estimated location data for each sensor or unique sensor pair;
   (d) determining residual values for the estimated location data for each sensor or unique sensor pair, wherein each residual value is determined based on a difference between the estimated location of the first device and the estimated location data for a corresponding one of the sensors or unique sensor pairs;
   (e) converting the residual values into corresponding weights for the estimated location data for each sensor or unique sensor pair;
   (f) weighting the estimated location data for each sensor or unique sensor pair by its corresponding weight; and
   (g) updating the estimated location of the first device using the weighted estimated location data for each sensor or unique sensor pair.

2. The method of claim 1, further comprising repeating steps (d) through (g) until one of: (1) a difference between a previous estimated location of the first device and an updated estimated location of the first device is less than a threshold value; and (2) a number of repetitions of steps (d) through (g) equals a maximum permitted number.

3. The method of claim 1, wherein determining the estimated location data for each sensor or unique sensor pair comprises determining, for each sensor, angle of arrival likelihood data for a signal received at the sensor from the first device, and wherein determining the estimated location of the first device using the estimated location data for each sensor or unique sensor pair comprises combining the angle of arrival likelihood data for each sensor.

4. The method of claim 1, wherein determining the estimated location data for each sensor or unique sensor pair comprises determining, for each sensor, likelihood data for the location of the first device as a function of position based on a time of arrival of a signal received at the sensor from the first device, and wherein determining the estimated location of the first device using the estimated location data for each sensor or unique sensor pair comprises combining the likelihood data for each sensor.

5. The method of claim 1, wherein determining the estimated location data for each sensor or unique sensor pair comprises determining, for each unique sensor pair, likelihood data for the location of the first device as a function of position based on a time difference of arrival of signals received at the unique pair of sensors from the first device, and wherein determining the estimated location of the first device using the estimated location data for each sensor or unique sensor pair comprises combining the likelihood data for each unique sensor pair.

6. The method of claim 1, wherein determining the estimated location data for each sensor or unique sensor pair comprises determining, for each unique sensor pair, likelihood data for the location of the first device as a function of position based on a ratio of powers of signals received at the unique pair of sensors from the first device, and wherein determining the estimated location of the first device using the estimated location data for each sensor or unique sensor pair comprises combining the likelihood data for each unique sensor pair.

7. The method of claim 1, wherein the signal received at each sensor from the first device is one of an RF signal, a microwave signal, and an acoustic signal.

8. The method of claim 1, wherein converting the residual values into corresponding weights for the estimated location data for each sensor or sensor pair comprises selecting a weight for each corresponding sensor or unique sensor pair that is inversely proportional to the residual value for the corresponding sensor or unique sensor pair.

9. The method of claim 1, wherein determining an estimated location of the first device using the estimated location data for each sensor or unique sensor pair comprises evaluating a total likelihood function $L(x, y)$ for all unique sensor pairs, as:

$$L(x, y) = \sum_{p,q} l_{p,q}(x, y)$$

where $I_{p,q}(x, y)$ is an individual likelihood function for sensor pair $(p,q)$, and wherein x and y are coordinates of a grid encompassing possible locations for the first device.

10. The method of claim 9, wherein $I_{p,q}(x, y)$ is calculated as $$l_{p,q}(x, y) = e^{-sR_{p,q}(x,y)}$$

where $R_{p,q}=|(r_p-r_q)-v\tau_{p,q}|$, and where v is the speed of propagation of the signal.

11. A system for determining a location of a first device that emits a signal, the system comprising:
at least three sensors separated and spaced apart from each other, each of the sensors including a receiver adapted to receive the signal emitted by the first device;
a network connecting the sensors and adapted to communicate data from the sensors; and
a processor programmed to execute an algorithm comprising:
(a) determining estimated location data for the first device for each sensor or unique sensor pair;
(b) determining an estimated location of the first device using the estimated location data for each sensor or unique sensor pair;
(c) determining residual values for the estimated location data for each sensor or unique sensor pair, wherein each residual value is determined based on a difference between the estimated location of the first device and the estimated location data for a corresponding one of the sensors or unique sensor pairs;
(d) converting the residual values into corresponding weights for the estimated location data for each sensor or unique sensor pair;
(e) weighting the estimated location data for each sensor or unique sensor pair by its corresponding weight; and
(f) updating the estimated location of the first device using the weighted estimated location data for each sensor or unique sensor pair.

12. The system of claim 11, wherein the processor is further programmed to repeat steps (c) through (f) until one of: (1) a difference between a previous estimated location of the first device and an updated estimated location of the first device is less than a threshold value; and (2) a number of repetitions of steps (c) through (f) equals a maximum permitted number.

13. The system of claim 11, wherein determining the estimated location data for each sensor or unique sensor pair comprises determining, for each sensor, angle of arrival likelihood data for a signal received at the sensor from the first device, and wherein determining the estimated location of the first device using the estimated location data for each sensor or unique sensor pair comprises combining the angle of arrival likelihood data for each sensor.

14. The system of claim 11, wherein determining the estimated location data for each sensor or unique sensor pair comprises determining, for each sensor, likelihood data for the location of the first device as a function of position based on a time of arrival of a signal received at the sensor from the first device, and wherein determining the estimated location of the first device using the estimated location data for each sensor or unique sensor pair comprises combining the likelihood data for each sensor.

15. The system of claim 11, wherein determining the estimated location data for each sensor or unique sensor pair comprises determining, for each unique sensor pair, likelihood data for the location of the first device as a function of position based on a time difference of arrival of signals received at the unique pair of sensors from the first device, and wherein determining the estimated location of the first device using the estimated location data for each sensor or unique sensor pair comprises combining the likelihood data for each unique sensor pair.

16. The system of claim 11, wherein determining the estimated location data for each sensor or unique sensor pair comprises determining, for each unique sensor pair, likelihood data for the location of the first device as a function of position based on a ratio of powers of signals received at the unique pair of sensors from the first device, and wherein determining the estimated location of the first device using the estimated location data for each sensor or unique sensor pair comprises combining the likelihood data for each unique sensor pair.

17. The system of claim 11, wherein the signal received at each sensor from the first device is one of an RF signal, a microwave signal, and an acoustic signal.

18. The system of claim 11, wherein converting the residual values into corresponding weights for the estimated location data for each sensor or sensor pair comprises selecting a weight for each corresponding sensor or unique sensor pair that is inversely proportional to the residual value for the corresponding sensor or unique sensor pair.

19. The system of claim 11, wherein determining an estimated location of the first device using the estimated location data for each sensor or unique sensor pair comprises evaluating a total likelihood function L(x, y) for all unique sensor pairs, as:

$$L(x, y) = \sum_{p,q} l_{p,q}(x, y)$$

where $I_{p,q}(x, y)$ is an individual likelihood function for sensor pair (p,q), and wherein x and y are coordinates of a grid encompassing possible locations for the first device.

20. The system of claim 19, wherein $I_{p,q}(x, y)$ is calculated as $$l_{p,q}(x, y) = e^{-sR_{p,q}(x,y)},$$

where $R_{p,q} = |(r_p - r_q) - v\tau_{p,q}|$, and where v is the speed of propagation of the signal.

* * * * *

UNITED STATES PATENT AND TRADEMARK OFFICE
CERTIFICATE OF CORRECTION

| | | |
|---|---|---|
| PATENT NO. | : 8,049,668 B1 | Page 1 of 1 |
| APPLICATION NO. | : 12/407535 | |
| DATED | : November 1, 2011 | |
| INVENTOR(S) | : David L. Gines | |

It is certified that error appears in the above-identified patent and that said Letters Patent is hereby corrected as shown below:

In column 11, line 54, in Claim 9, delete "$I_{p,q}(x, y)$" and insert -- $l_{p,q}(x, y)$ --, therefor.

In column 11, line 59, in Claim 10, delete "$I_{p,q}(x, y)$" and insert -- $l_{p,q}(x, y)$ --, therefor.

In column 11, line 63, in Claim 10, after " $l_{p,q}(x, y) = e^{-sR_{p,q}(x,y)}$ " insert -- , --.

In column 14, line 9, in Claim 19, delete "$I_{p,q}(x, y)$" and insert -- $l_{p,q}(x, y)$ --, therefor.

In column 14, line 13, in Claim 20, delete "$I_{p,q}(x, y)$" and insert -- $l_{pq}(x, y)$ --, therefor.

Signed and Sealed this
Tenth Day of April, 2012

David J. Kappos
*Director of the United States Patent and Trademark Office*